(12) United States Patent
Babich

(10) Patent No.: US 8,950,688 B2
(45) Date of Patent: Feb. 10, 2015

(54) APPARATUS AND METHOD FOR SELF-TEST OF THERMOSTAT

(75) Inventor: Thomas S. Babich, Glen Cove, NY (US)

(73) Assignee: Honeywell International, Inc., Morristown, NJ (US)

(*) Notice: Subject to any disclaimer, the term of this patent is extended or adjusted under 35 U.S.C. 154(b) by 909 days.

(21) Appl. No.: 13/161,693

(22) Filed: Jun. 16, 2011

(65) Prior Publication Data

US 2012/0318879 A1    Dec. 20, 2012

(51) Int. Cl.
    *G05D 23/00*      (2006.01)
    *G05D 23/19*      (2006.01)
    *F24F 11/00*      (2006.01)

(52) U.S. Cl.
    CPC ......... *G05D 23/1902* (2013.01); *F24F 11/0012* (2013.01)
    USPC ................................ 236/51; 236/94; 700/276

(58) Field of Classification Search
    USPC ...................... 236/1 C, 51, 94; 700/276, 277; 340/870.17
    See application file for complete search history.

(56) References Cited

U.S. PATENT DOCUMENTS 6,619,055 B1 * 9/2003 Addy .............................. 62/126
2002/0014946 A1 * 2/2002 Bianchi et al. ................ 337/304

* cited by examiner

*Primary Examiner* — Marc Norman
(74) *Attorney, Agent, or Firm* — Paul M. Vargo; Husch Blackwell LLP

(57) ABSTRACT

An environmental control system includes at least one of a security monitoring system, or a building automation control system. A thermostat coupled to the at least one system, where the thermostat provides feedback as to output signals therefrom to evaluate functioning of the thermostat. The output signals would be coupled to a heating, ventilating and air conditioning system.

16 Claims, 1 Drawing Sheet

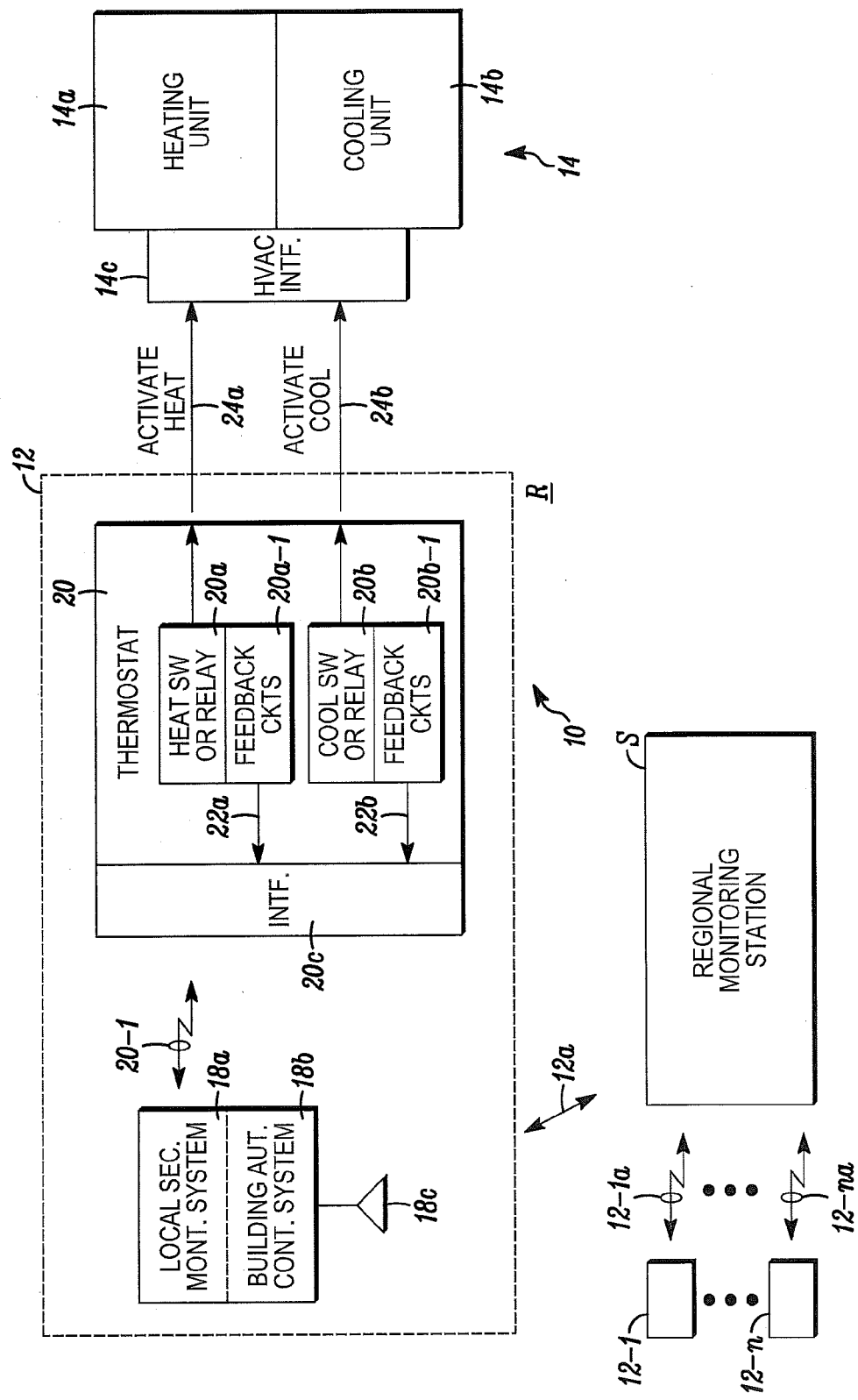

APPARATUS AND METHOD FOR SELF-TEST OF THERMOSTAT

FIELD

The application pertains to apparatus and methods for self-testing of thermostats associated with a security system, or an environmental control system, associated with a commercial building or residence. More particularly, the application pertains to such apparatus and methods where confirmatory feedback signals can be generated by the thermostat for diagnostic or self-test purposes.

BACKGROUND

The security space is evolving into Green solutions, home automation, lighting control and HVAC integration. The challenge going forward is that security dealers monitoring security systems in homes with integrated HVAC thermostats will be getting the calls when the HVAC system is not operating, whether it is caused by the security/home automation/thermostat or not.

They will be spending money to investigate HVAC malfunctions not associated with the security system, home automation system, or thermostat, by having to send a service technician to the site to rule out the security/home automation/thermostat. Such unnecessary trips can become a significant expense.

BRIEF DESCRIPTION OF THE DRAWINGS

FIG. 1 is a block diagram illustrating aspects of a system in accordance herewith.

DETAILED DESCRIPTION

While disclosed embodiments can take many different forms, specific embodiments thereof are shown in the drawings and will be described herein in detail with the understanding that the present disclosure is to be considered as an exemplification of the principles thereof as well as the best mode of practicing same, and is not intended to limit the application or claims to the specific embodiment illustrated.

In one aspect, a thermostat can be integrated into a security system or home automation system (using wired, wireless, z-wave, ziggbie or other). The thermostat includes a self-test feature that can ensure that when the temperature is raised or lowered, whether on site or remotely, the proper thermostat relay is triggered/restored sending the proper signal to the HVAC equipment then responsible for heating or cooling. A message can be transmitted that the heating and cooling interface relays are functioning properly and when required. In such instances, HVAC malfunctioning usually resides in other parts of the HVAC system such as a blower, a boiler, air conditioner, or power to the boiler.

In operation, a homeowner or business calls the central station complaining of HVAC issue. The central station can ask an on-site person to initiate a test, can initiate the test remotely, or simply monitor the indicators of a continual test.

Central station personnel can then ask the on-site person to raise the thermostat set point above the actual temperature in the room or region being monitored. Conversely, the central station can raise the thermostat set point remotely without a local presence. When the thermostat is above the temperature, there should be the appropriate relay activation/deactivation (so in the summer, the cooling, for example air conditioning, function should turn on. In the winter, the heating function would turn off). The self-test would send a message indicating the actual state of the relay to the security system/home automation system which then transmits the message to the central station.

Central station personnel, or the on-site person can then lower the set point temperature to ensure the relays switch state once again. In this way, the central station personnel can eliminate the need for a service call due to malfunctioning equipment beyond the scope of the equipment they installed and are monitoring. Advantageously, they can fully test the thermostat functionality, ensuring relay activation/deactivation for heating/cooling/humidity above and below a set point threshold.

FIG. 1 illustrates an overall combination 10, in accordance herewith, which includes an environmental control element 12 which is coupled to a conventional HVAC system 14. System 14 includes heating and air conditioning sub-systems 14a, b and a connection interface 14c. System 14 responds to control signals generated by control element 12 as discussed below. Combination 10 provides heating, and/or cooling for a monitored region R, a residence or other building.

Control element 12 can include one or both of a local security monitoring system 18a, and/or home or building automation control system 18b. A local thermostat 20, which monitors temperature in the region R, is in wired or wireless communication, indicated at 20-1, with one or both of the systems 18a,b. Thermostat 20, on a programmed, or non-programmed, basis couples heating or cooling control signals such as 24a, b, via a heating signal output port and a cooling signal output port, to the heating and air conditioning units 14a,b to heat or cool the region R as would be understood by those of skill in the art.

It will be understood that the specific details of thermostat 20, except as described herein, are not limitations of the scope of the claims hereof. Embodiments implemented with various types of thermostats come within the spirit and scope hereof. Similarly, the details of any associated HVAC system are not limitations of the claims hereof.

In accordance herewith, the thermostat 20 includes a heater switch, for example a solid state switch, or a relay, 20a and an air conditioning switch, a different switch or relay, 20b which provide the switched control signals 24a, b to the HVAC system 14. In addition, thermostat 20 includes circuitry 20a-1, 20b-1 to generate feedback signals 22a, 22b indicative of the real-time values of signals 24a,b.

The feedback signals 22a, 22b can be coupled or transmitted via interface 20c to the system or systems 18a, b to provide information to the system(s) 18a,b as to the values or states of output signals 24a,b being coupled to the HVAC interface 14c. Those feedback signals, received via communication link 20-1 can be evaluated at the respective security system 18a, or automation control system 18b to determine if the switches, or relays 20a, 20b are functioning properly.

It will also be understood that various circuits can be used to generate the feedback signals 22 a,b from thermostat 20. For example, optical isolators, or operational amplifiers coupled to the control signals 24 a,b could be used to generate the feedback signals. The exact details thereof are not limitations of the claims hereof.

The thermostat 20 can include the transmission interface 20c which receives the feedback signals 22a,b and forwards them, via link 20-1 to the system(s) 18a,b. It will be understood that where the feedback message, or messages sent from thermostat 20 indicate that the thermostat 20 is working properly, and the heating unit 14a or cooling unit 14b are not responding properly, service of one or both of those units may be required. For example, a defective boiler or furnace such as 14a, or, a failure of power to the boiler or furnace, or a malfunction of the air conditioner 14b may need to be addressed, quite apart from any of the systems 18a,b or thermostat 20.

The structure 12 could also be in wireless communication, via antenna 18c and communication link 12a, with a regional monitoring station S where monitoring personnel can respond to incoming messages from structure 12. In the event that individuals working or residing in the monitored region R contact the monitoring station S relative to performance of the HVAC system 14, the feedback signals 22a, b provide diagnostic information as to where a problem might be located.

It will also be understood that the central station S might be in real-time, wireless communication with a plurality of environmental control systems 12-1, -2,-3 ... -n comparable to the system 10. As a result of being able to evaluate feedback from the respective thermostats, comparable to thermostat 20, personnel at the central station S will be able to more effectively and promptly provide preliminary assessments as to where maintenance is needed with respect to displaced, respective environmental control systems 12-1 . . . 12-n.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims. Further, logic flows depicted in the FIGURE do not require the particular order shown, or sequential order, to achieve desirable results. Other steps may be provided, or steps may be eliminated, from the described flows, and other components may be add to, or removed from the described embodiments.

The invention claimed is:

1. An environmental control apparatus comprising:
   at least one of a security monitoring system, or a building automation control system; and
   a thermostat which monitors temperature in a selected region, and, provides separate heating and cooling output signals, the thermostat is coupled to at least one system, the output signals would be coupled to heating and cooling inputs of a heating, ventilating and air conditioning system and the thermostat includes first and second feedback circuits coupled to the heating and cooling signals to provide feedback at the thermostat and to at least one system that the thermostat is working properly and a respective heating or cooling unit is not responding properly.

2. An apparatus as in claim 1 where the feedback provides information as to functioning of selected components of the thermostat.

3. An apparatus as in claim 2 where the selected components of the thermostat include at least one of electro-mechanical relays, or solid state switches.

4. An apparatus as in claim 1 where at least one system communicates information as to the feedback to a displaced monitoring station.

5. An apparatus as in claim 1 where at least one system includes circuitry to evaluate feedback from the thermostat.

6. An apparatus as in claim 5 where the feedback comprises electrical signals indicative of selected parameters of the output signals.

7. An apparatus as in claim 6 which includes feedback signal generating circuits coupled to electrical signals from the thermostat.

8. An apparatus as in claim 7 where the circuits include at least one of optical isolators, or operational amplifiers.

9. An apparatus as in claim 1 where the circuits include at least one of optical isolators, or operational amplifiers.

10. A regional monitoring system comprising:
    one of a residential security system, or a home automation system; and
    a thermostat to monitor temperature in a selected region, the thermostat includes a heating control output signal and a cooling control output signal and feedback circuits coupled to each of the output signals to generate feedback signals indicative of the real-time state of the heating control output signal, and the cooling control output signal wherein the feedback signals are coupled by the thermostat to one of the systems.

11. A system as in claim 10 where the thermostat includes an output interface to couple the feedback signals, via one of a wired, or a wireless communication link to at least one of the security system or the automation system.

12. A system as in claim 11 where the circuitry includes at least one of optical isolators, or operational amplifiers.

13. A device to control a heating and air conditioning system comprising:
    a wireless thermostat to monitor temperature in a selected region, the thermostat includes at least one of a heating signal output port and a cooling signal output port for at least one of a heating control output signal or a cooling control output signal and at least one feedback circuit coupled to at least one of the output signals to generate feedback signals indicative of the real-time state of the one output signal, and, a bidirectional communications interface coupled at least to the one feedback circuit wherein the feedback signals are coupled from the thermostat via the interface, and the at least one heating or cooling output signal is emitted from the respective port.

14. A device as in claim 13 where the thermostat includes first and second feedback circuits coupled between a respective control output signal and the communications interface.

15. A device as in claim 14 where the feedback circuits each comprise an isolating electrical circuit.

16. A device as in claim 14 where the communications interface provides feedback from the thermostat to at least one separate system that the thermostat is working properly and a respective heating or cooling unit is not responding properly.

* * * * *